United States Patent
Quiroga

(10) Patent No.: US 7,861,984 B2
(45) Date of Patent: Jan. 4, 2011

(54) ANATOMIC SUPPORT FOR HAND AND WRIST

(75) Inventor: Lecy Maria Vasconcelos Quiroga, Rio de Janeiro (BR)

(73) Assignee: De Sousa Freitas, Eduardo Luis Bueno, Windermere, FL (US)

(*) Notice: Subject to any disclaimer, the term of this patent is extended or adjusted under 35 U.S.C. 154(b) by 0 days.

(21) Appl. No.: 11/663,148

(22) PCT Filed: Dec. 29, 2004

(86) PCT No.: PCT/BR2004/000254
§ 371 (c)(1), (2), (4) Date: Mar. 16, 2007

(87) PCT Pub. No.: WO2006/029488
PCT Pub. Date: Mar. 23, 2006

(65) Prior Publication Data
US 2008/0001042 A1    Jan. 3, 2008

(30) Foreign Application Priority Data
Sep. 16, 2004 (BR) .................................. 0403892
Sep. 16, 2004 (BR) .................................. 0404007

(51) Int. Cl.
*B68G 5/00* (2006.01)
(52) U.S. Cl. ............... 248/118; 248/118.1; 248/118.5; 248/918; 400/715
(58) Field of Classification Search ............... 248/118, 248/118.1, 118.5, 918; 400/715
See application file for complete search history.

(56) References Cited

U.S. PATENT DOCUMENTS

| | | | | |
|---|---|---|---|---|
| 3,300,250 A | * | 1/1967 | Dollgener et al. | 248/118.1 |
| 4,862,165 A | * | 8/1989 | Gart | 341/20 |
| 5,163,646 A | * | 11/1992 | Engelhardt | 248/118 |

(Continued)

FOREIGN PATENT DOCUMENTS

DE    29919297 U1    3/2000

(Continued)

OTHER PUBLICATIONS

PCT International Search Report, PCT/BR2004/000254, dated May 11, 2005.

*Primary Examiner*—Terrell Mckinnon
*Assistant Examiner*—Michael McDuffie
(74) *Attorney, Agent, or Firm*—Nixon & Vanderhye, PC

(57) ABSTRACT

An anatomical support for hand and wrist is provided. A first embodiment relates to a support for hand and wrist provided with a protruding region, which serves as an anatomical abutment for the central region of the palm of the hand of a user. The remaining parts of the upper surface of the support anatomically accommodate both the wrist and the remaining regions of the anterior portion of the palm of the hand of said user. A second embodiment relates to a support provided with an upper portion made of a substantially elastic material. There is a hollow between the upper part of the inferior portion and the internal portion of the upper portion, and said hollow is filled up with a highly viscous and nearly solid buttery substance, which enables he upper portion to by shaped by pressure to fit both the wrist and the hand of the user.

8 Claims, 4 Drawing Sheets

U.S. PATENT DOCUMENTS

| | | | | |
|---|---|---|---|---|
| 5,228,655 A * | 7/1993 | Garcia et al. | ................ | 248/118 |
| 5,234,186 A * | 8/1993 | Powell | .................... | 248/118.1 |
| 5,242,139 A * | 9/1993 | Aldrich | .................... | 248/118 |
| 5,265,835 A * | 11/1993 | Nash | .......................... | 248/118 |
| 5,349,192 A | 9/1994 | Mackay | | |
| 5,398,896 A * | 3/1995 | Terbrack | .................. | 248/118.5 |
| 5,472,161 A | 12/1995 | Krukovsky | | |
| 5,566,913 A * | 10/1996 | Prokop | ..................... | 248/118 |
| 5,568,907 A * | 10/1996 | Wolfe et al. | ................. | 248/118 |
| 5,678,266 A * | 10/1997 | Petringa et al. | ............. | 5/655.5 |
| 5,730,711 A * | 3/1998 | Kendall et al. | ................ | 602/64 |
| 5,803,416 A * | 9/1998 | Hanson et al. | .............. | 248/118 |
| 5,865,404 A * | 2/1999 | Hesley | ....................... | 248/118 |
| 5,892,499 A | 4/1999 | Vulk, Jr. | | |
| 5,918,839 A * | 7/1999 | DuBois | ...................... | 248/118 |
| 5,954,303 A * | 9/1999 | Wolf et al. | ............... | 248/118.3 |
| 5,980,143 A * | 11/1999 | Bayer et al. | ................. | 400/715 |
| 6,017,006 A * | 1/2000 | Cherubini et al. | ........... | 248/118 |
| 6,032,913 A | 3/2000 | Dawson | | |
| 6,048,325 A * | 4/2000 | Kendall et al. | ................ | 602/21 |
| 6,082,682 A | 7/2000 | So et al. | | |
| 6,082,684 A | 7/2000 | Chuang | | |
| 6,089,516 A * | 7/2000 | Yates | ......................... | 248/118 |
| 6,219,867 B1 * | 4/2001 | Yates | ......................... | 5/655.5 |
| 6,293,026 B1 * | 9/2001 | Lee et al. | ...................... | 33/512 |
| 6,328,266 B1 * | 12/2001 | Yates | ......................... | 248/118 |
| 6,362,811 B1 * | 3/2002 | Edwards et al. | ............. | 345/163 |
| 6,492,975 B1 | 12/2002 | Weiss | | |
| 6,494,418 B1 * | 12/2002 | Wolf et al. | .................. | 248/118 |
| 6,499,703 B2 * | 12/2002 | Chou | ......................... | 248/118 |
| 6,506,271 B1 * | 1/2003 | Yates | ......................... | 156/79 |
| 6,663,056 B1 * | 12/2003 | Lee | ......................... | 248/118.1 |
| 6,672,548 B1 * | 1/2004 | Yates | ......................... | 248/118 |
| 6,726,158 B2 * | 4/2004 | Issa | ......................... | 248/118.1 |
| 2002/0162919 A1 * | 11/2002 | Kuo | .......................... | 248/118 |
| 2003/0169236 A1 | 9/2003 | Crocker | | |
| 2003/0209641 A1 * | 11/2003 | Cooke | ........................ | 248/118 |

FOREIGN PATENT DOCUMENTS

| | | |
|---|---|---|
| DE | 29919434 U1 | 4/2000 |
| FR | 2812108 | 1/2002 |
| WO | 99/05062 | 2/1999 |
| WO | WO 99/05062 | 2/1999 |
| WO | WO 00/57749 | 10/2000 |

\* cited by examiner

ANATOMIC SUPPORT FOR HAND AND WRIST

This application is a U.S. national phase of International Application No. PCT/BR2004/00254 filed Dec. 29, 2004, which designated the U.S. and claims priority to Brazilian Application No. PI 0404007-4, filed Sep. 16, 2004 and Brazilian Application No. PI 0403892-4, filed Sep. 16, 2004, the entire contents of each of which are hereby incorporated by reference.

FIELD OF THE INVENTION

The present invention relates to a support for both the hand and the wrist of an individual who uses a keyboard of a computer. More specifically, the present invention relates to a support for hand and wrist which is provided with anatomical features in order to provide substantial support for the hands and the wrists of an individual who uses a keyboard or the like.

RELATED ART

Individuals who execute tasks involving excessive, continuous and repetitive efforts, without periodically sopping for resting, may eventually develop a disease known as Repetitive Strain Injury—RSI.

The acronym RSI relates to a group of diseases which mainly affect the upper extremities, shoulders, wrists and hands, causing irritations, swellings and damages to tendons, nerves, muscles, and other soft body tissues. Injuries such as RSI are usually caused by repeated and continuous physical movements, which cause an excessive load to the muscles, beyond their inherent capacity for immediate recovery. Bad sitting posture, stress and bad working conditions also contribute for the development of RSI.

In extreme cases, RSI can cause serious injures to the tendons, extreme pain and loss of movements. RSI encompasses a number of diseases, such as tenosynovitis, tendinitis, epicondylitis, carpal tunnel syndrome, bursitis, etc. RSI is also known by many experts as osteo-muscular work-related disorders. Another designation for RSI is Cumulative Trauma Disorder.

Injuries such as RSI cause serious problems both to employees and employers, as increasingly a number of workers become inactive for long terms due to RSI injuries.

In recent years the growing use of personal computers in almost all the professional and educational activities has caused a significantly growing number of persons suffering from RSI, fundamentally as a consequence of the need of the use of keyboards to enter data and to operate the computers. Such operation is known as typing.

It is widely known that the typing operation, in view of its inherent repeated and continuous physical movements, can cause serious injuries to the individuals who must operate keyboards for a long term of their lives ascribable to their professional activities.

Typing operation is characterized by the execution of small, continuous and fast movements with the fingers. Along the time such typing operation can cause an overload in the muscles, muscular fascias, blood vessels, tendons, ligaments, articulations and nerves of the hands of a person who types in such conditions. Frequently such overload cause serious RSI injuries in persons who work in the above-mentioned conditions.

It is noted that a lack of a support for the hands and wrists of a typist is the main cause contributing to RSI injuries from appearing.

Although RSI-like injuries in typists are well known for years it has not been noticed a more serious preoccupation with the search of solutions which do away with or mitigate the nasty effects of RSI-like injuries in typists.

It is known in the art the use of a wedge-like piece attached to the forward part of the keyboard, where the wrists of the typist rest, said wedge-like piece serving as a support for the wrists.

The use of such wedge-like piece has proved to be inefficient to solve the problem, as besides being incommodious it serves only as a support for the wrists of the typist, leaving the palm of the hands of the typist unsupported. As this wedge-like piece is inefficient and incommodious, the typists usually detach it from the keyboard and simply type the keyboard without using it.

U.S. Pat. No. 5,439,192, published on 8 Aug. 1995 and entitled "Hand-worn device for elevating the hand and fingers with respect to a keyboard", discloses a hand-worn device for encircling the base portion of a person's hand and for elevating that hand and the associated fingers with respect to a keyboard. Said device is provided with a pliable and elastic cuff that encircles the base of the hand and which includes a thumb opening, through which the thumb of the hand projects.

The cuff specifically encircles and wraps around the lower base of the hand and particularly wraps around and covers the heel of the hand. An attachable and relatively small elevating pad is provided, designed to attach directly to the cuff in the area adjacent the heel of the hand. The elevating pad is substantially as high as the keyboard, so as to keep the hands of the typist at the same level of the keys of the keyboard.

Although the device disclosed in U.S. Pat. No. 5,439,192 is able to provide a support for the wrist of the typist, it is inefficient to provide a substantial support for the palms of the hands and therefore it is inefficient to prevent DSI-like injuries from occurring.

It should be also mentioned that the device disclosed in U.S. Pat. No. 5,439,192 is incommodious, as it is necessary to permanently use the cuff around the lower base of the hand, and this can inconvenience the typist when he/she has to use the hands to do another task, such as writing with a pen, answering a phone call, etc., which would require the typist to remove the elevating pad from the cuff.

It should be also mentioned that the cuff itself is uncomfortable to perform the typing task, and in case the cuff is too tight it can cause problems to the blood circulation in the wrists and the hands of the typist. Therefore, instead of being a prevention for RSI the device disclosed in U.S. Pat. No. 5,439,192 can otherwise aggravate the RSI injury.

U.S. Pat. No. 6,048,325, published on 11 Apr. 2000, and entitled "Wrist/Hand Support Device," discloses a complex wrist support device comprising a number of separate pieces attached there. It encompasses a modular wrist support body comprising a separate lower portion attached to an upper portion, which is formed of a resilient shell. Said upper portion is attached to the lower portion, and a cavity is formed between the upper portion and the lower portion. Into the cavity there is a cushion which permanently forces the upper portion to have a generally convex shape.

Although the device disclosed in U.S. Pat. No. 6,048,325 is able to provide a support for the wrist and the hand of the user, it is inefficient to permanently provide a support for the wrist and the anterior palm of the hand in a fixed position, and is not effective when the user needs to slid the support to use the distal keys of the keyboard, as there is a possibility that user has to make pressure on the upper surface of the device to guarantee that it will slide.

SUMMARY OF THE INVENTION

The present invention relates to an anatomic support for hand and wrist which is meant to anatomically support the hand and the wrist of a person who is operating a keyboard or the like.

A first embodiment of the support object of the present invention comprises an upper surface, a side surface and an inferior surface. The upper surface is provided with a shape which enable the wrist and the anterior portion of the palm of the hands of a person operating the keyboard to be substantially supported, anatomically resting upon the upper surface.

A central portion of the upper surface of the anatomic support for hand and wrist is provided with a protruding region, which serves as an anatomical abutment for the central region of the palm of the hand of the person who operates the keyboard.

The remaining parts of the upper surface of the anatomic support for hand and wrist are designed to anatomically accommodate the wrist and the remaining regions of the anterior portion of the palm of the hand of the person who operates the keyboard.

A second embodiment of the support object of the present invention comprises an upper portion, a side portion and an inferior portion. The upper portion is provided with an upper surface, and the inferior portion is provided with an inferior surface.

The inferior portion is made of a rigid material, and the upper portion is made of a substantially elastic material. The rim of the upper portion is joined to the upper part of the inferior portion, and there is a hollow between the upper part of the inferior portion and the internal portion of the upper portion. The hollow is filled up with a buttery substance, in order to enable the user of the support for hand and wrist to fit the upper portion to the shape of both the wrist and the anterior portion of the palm of his/her hand.

To conform the support to both the wrist and the anterior portion of the palm of his/her hand the user should lean his/her hand on the upper surface of the upper portion of the support and next he/she should press his/her hand against said upper portion, so as to cause the buttery substance inside the hollow to move.

Thereby the upper portion becomes shaped to anatomically support the wrist and the anterior region of the palm of the hand of the user, enabling him/her to type the keyboard or the like with the wrist and the anterior portion of the palm of his/her hand anatomically supported on the upper portion of the support.

BRIEF DESCRIPTION OF THE DRAWINGS

The invention will be described in details hereupon, together with the attached drawings which are part of the present specification, for the purpose of exemplification.

DETAILED DESCRIPTION OF THE INVENTION

Figure 1:
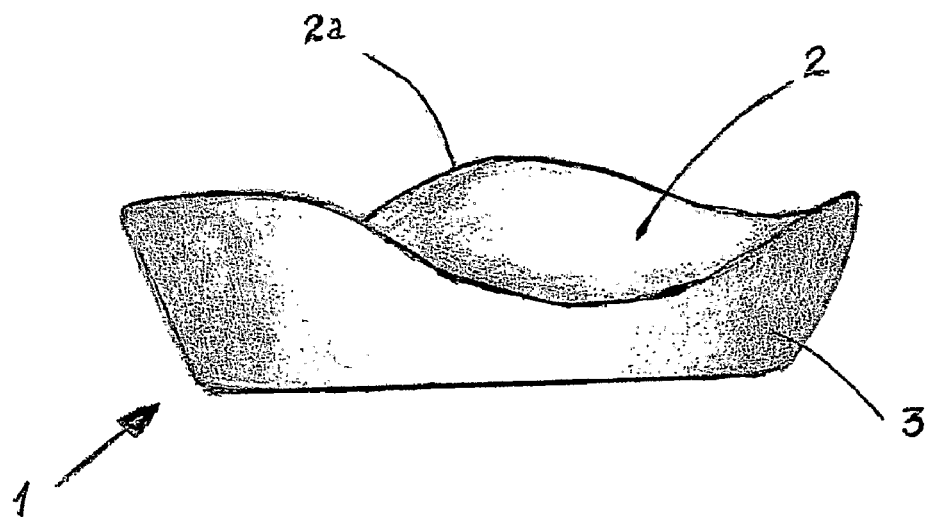
FIG. 1 is rear view of a first embodiment of the support for hand and wrist object of the present invention.
Figure 2:
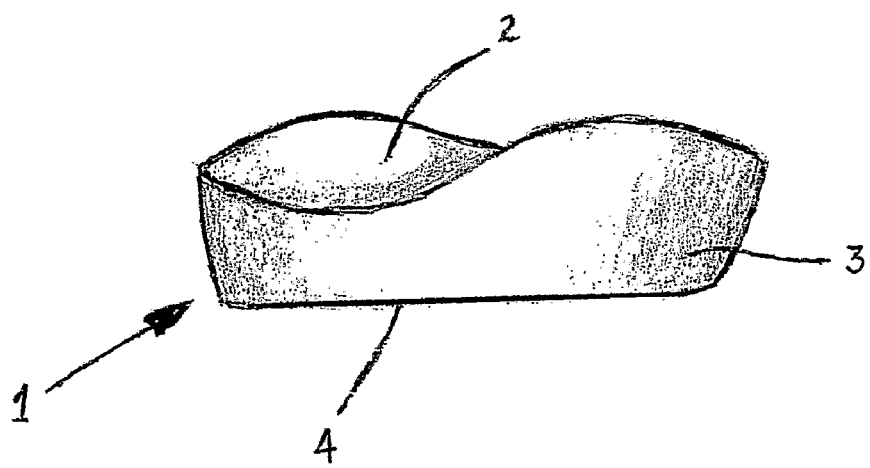
FIG. 2 is a side view of the support for hand and wrist of FIG. 1, taken from the right.
Figure 3:
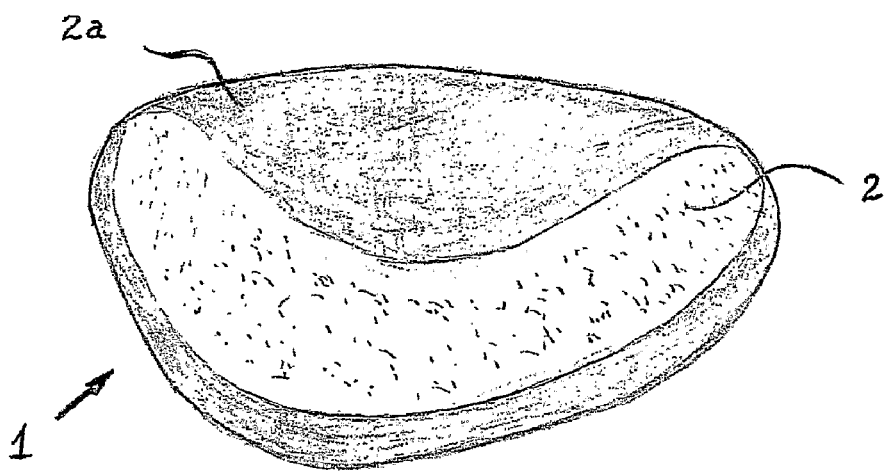
FIG. 3 is a plan view of the support for hand and wrist of FIG. 1.
Figure 4:
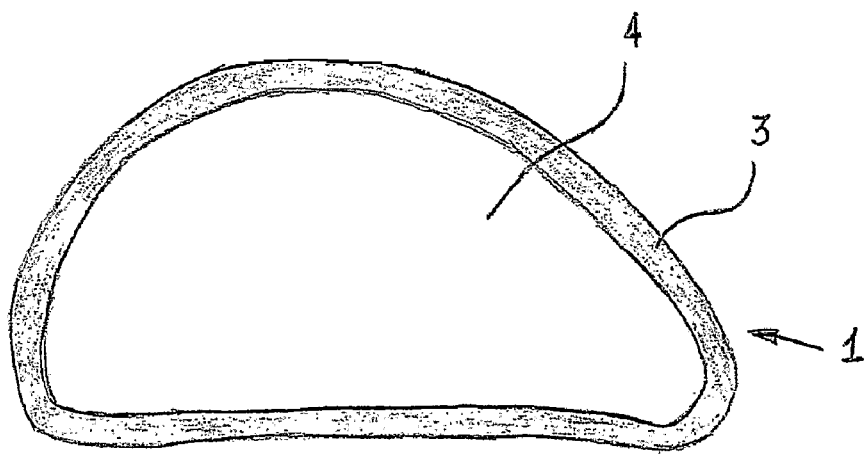
FIG. 4 is a inferior view of the support for hand and wrist of FIG. 1.

The present invention relates to an anatomic support for hand and wrist (1) of a person, which is meant to serve as a support for both the hand and the wrist of a person who is operating a keyboard (6) or the like.

FIGS. 1-5 relates to a first embodiment of the anatomic support for hand and wrist (1) object of the present invention, which is made of a substantially rigid material, and comprises an upper surface (2), a side surface (3) and an inferior surface (4).

The upper surface (2) of the anatomic support for hand and wrist (1) is provided with a shape which enable both the wrist and the anterior portion of the palm of the hands of a person who operates the keyboard (6) to be substantially supported, anatomically resting upon the upper surface (2)

A central portion of the upper surface (2) of the anatomic support for hand and wrist (1) is provided with a protruding region (2a), which serves as an anatomical abutment for the central region of the palm of the hand of the person who operates the keyboard (6).

Figure 5:
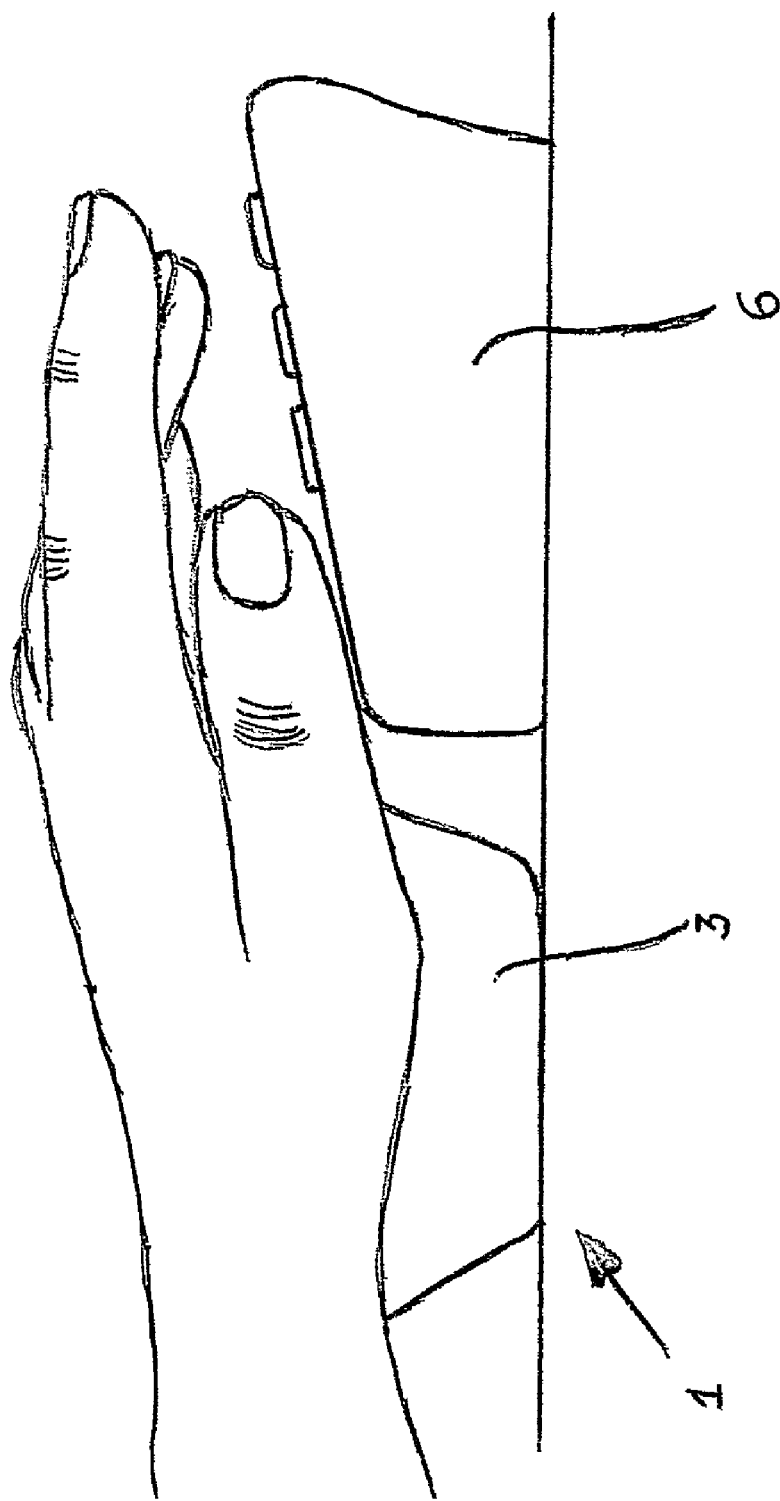
FIG. 5 is a side view of the support for hand and wrist of FIG. 1, taken from the right, showing one hand resting on the support in the working position.

The remaining parts of the upper surface (2) of the anatomic support for hand and wrist (1) are designed to anatomically accommodate both the wrist and the remaining regions of the anterior portion of the palm of the hand of the person who operates the keyboard (6), as can be seen in FIG. 5.

Therefore, the upper surface (2) of the anatomic support for hand and wrist (1) is designed in such a way to serve as an anatomical support for both the anterior portion of the palm of the hand and the wrist of a person operating the keyboard (6), thereby allowing them to be all anatomically supported.

As a consequence no effort is required from the individual operating the keyboard (6) to keep his/her hands placed on an adequate level with respect to the keyboard (6), and so the effort made by such individual is only used to operate the keys of the keyboard (6).

Preferably the inferior surface (4) of the anatomic support for hand and wrist (1) is made in such a way to be very smooth, with a low friction coefficient, so as to enable the anatomic support for hand and wrist (1) to be easily slid upon the surface where it rests.

Therefore, in view of such feature of being easily slid upon a surface, the anatomic support for hand and wrist (1) not only facilitates the small movements usually made by the person who operates the keyboard (6) during the typing task, but also enables him/her to use the mouse keeping at the same time his/her hand supported upon the anatomic support for hand and wrist (1).

In other words, the user needs not to remove his hand from the support for hand and wrist (1) when he/she needs to use the mouse, and therefore his/her hand remains supported even when he/she uses the mouse.

The anatomical feature of the upper surface (2) of the anatomic support for hand and wrist (1) is very advantageous for the person who is using a keyboard, as follow:

a) as both the wrist and the anterior portion of the palm of the hand are substantially and anatomically supported by the anatomic support for hand and wrist (1), then the tendons and muscles of the hands work more relaxed, thereby reducing the risk from RSI injuries from occurring;

b) as all the muscles of the cervical and scapular chains work in a more relaxed way, as the weight of the hands is anatomically supported upon the anatomic support for hand and wrist (1), the shoulders of a person who operates a keyboard (6) become more relaxed, thereby contributing to reduce the risk from RSI injuries from occurring;

c) by supporting both the wrist and the anterior portion of the palm of the hand, the anatomic support for hand and wrist (1) causes the wrist to flex less than when it is unsupported, thereby precluding the wrist from stretching more than it should do, and so the anatomic support for hand and wrist (1) contributes to reduce the risk from RSI injuries from occurring;

The anatomic support for hand and wrist (1) of the present invention may be provided with a variety of sizes, in order to fit a variety of sizes of hands. Therefore, according to the present invention it is possible to provide an anatomic support for hand and wrist (1) which is able to fit small, medium-size and large hands.

Figure 6:
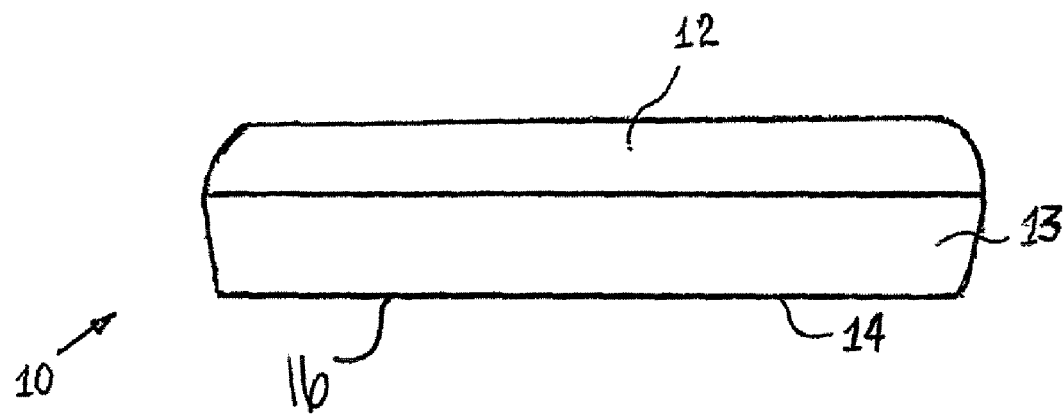
FIG. 6 is rear view of a second embodiment of the support for hand and wrist object of the present invention previously it being shaped to the hand of a user.
Figure 7:
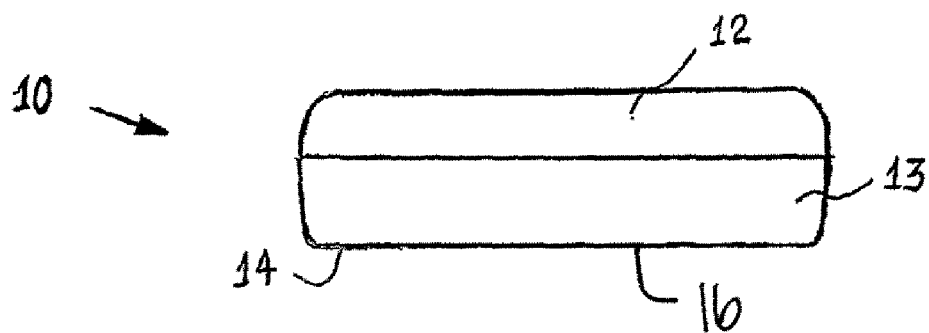
FIG. 7 is a side view of the support for hand and wrist of FIG. 6, taken from the right.

FIGS. 6 and 7 show a second embodiment of an anatomic support for hand and wrist (10) object of the present invention, which comprises an upper portion (12), a side portion (13) and an inferior portion (14). The inferior portion (14) is provided with an inferior surface (16).

Preferably the inferior surface (16) of the anatomic support for hand and wrist (10) is made in such a way to be very smooth, with a low friction coefficient, so as to enable the anatomic support for hand and wrist (10) to be easily slid upon the surface where it rests.

The inferior portion (14) is made of a rigid material, and the upper portion (12) is made of a substantially elastic material. The rim of the upper portion (12) is joined to the upper part of the inferior portion (14), and there is a hollow between the upper part of the inferior portion (14) and the internal portion of the upper portion (12). The hollow is filled up with a buttery substance.

According to the present invention a buttery substance is any highly viscous material having a nearly solid consistency at ordinary temperatures.

By using such highly viscous and nearly solid buttery substance to fill up the hollow it enables a user of the anatomic support for hand and wrist (10) to fit the upper portion (12) to the shape of both the wrist and of the anterior portion of the palm of his/her hand, as is described in the following.

First the user of the support for hand and wrist (10) should lean his/her hand on the upper portion (12) in such a position that both the wrist and the anterior region of his/her hand rest on the upper portion (12).

Next the user should press his/her hand against the upper portion (12), so as to cause the buttery substance inside the hollow between the upper portion of the inferior portion (14) and the internal portion of the upper portion (12) to move. Thereby the upper portion (12) becomes shaped to anatomically support both the wrist and the anterior portion of the palm of the hand of the user, assuming a shape like the anatomic support for hand and wrist (1) shown in FIGS. 1 to 5.

In case the shape assumed by the upper portion (12) is not appropriate for the user, or in case the shape has been accidentally modified, the user has just to repeat the above operation to fit the upper portion (12) to both his/her hand and wrist, in order to make the upper portion (12) to assume the adequate shape.

It should be mentioned that the user should proceed with the above operation for each of his/her hands.

After assuming a shape which is adequate to support both the wrist and the anterior portion of the palm of the hand of the user, the anatomic support for hand and wrist (10) operates like the anatomic support for hand and wrist (1) of the first embodiment.

The anatomic support for hand and wrist (10) of the present invention may be provided with a variety of sizes, in order to fit a variety of sizes of hands. Therefore, according to the present invention it is possible to provide an anatomic support for hand and wrist (10) which is able to fit small, medium-size and large hands.

Those skilled in the art would recognise that modifications can be made in the anatomic support for the wrist and the hand object of the present invention without departing from the spirit and the basic concepts of the invention, that is, the use of a support whose upper portion is provided with an anatomic shape to support both the wrist and the hand of a user.

Although the anatomic support for hand and wrist has been described herein for use with a keyboard or a mouse of a computer, it should be mentioned that its use is not restricted to the above-mentioned equipments, as the support object of the present invention can be used in any situation where it is needed a support for both hands and wrist.

Therefore the anatomic support for hand and wrist is not limited to the content of the above description, and so it is only limited to the content of the appendant claims.

The invention claimed is:

1. An anatomic support for hand and wrist comprising an upper surface, a side surface and an inferior surface, forming an integral body to anatomically accommodate the wrist and the anterior part of the hand of a user wherein the upper surface includes a forward edge and a rear.edge, wherein said inferior surface is smooth, having a low friction coefficient, so as to enable the anatomic support for hand and wrist to be easily slid upon the surface where it rests, and, wherein:

a central portion of the forward edge of the support is provided with a permanent protruding region which rises above left and right sides of the forward edge, and which serves as a permanent anatomical abutment for a central region of the palm of the hand of a user;

the remaining parts of the upper surface permanently and anatomically accommodating both the wrist and the remaining regions of the anterior portion of the palm of the hand of said user, wherein a user can push a hand and wrist into the upper surface under pressure to cause the upper surface to assume a first shape which conforms to the shape of the wrist and the anterior part of the hand to anatomically accommodate said wrist and anterior portion of the palm of the hand, and wherein at ordinary room temperatures, after being pressurized to form the first shape, the upper surface will retain the first shape, even if the user removes his hand and wrist from the upper surface, until the user again pushes a hand and wrist into the upper surface under pressure to cause the upper portion to assume a new shape.

2. An anatomic support according to claim 1 wherein it can be provided with a variety of sizes, in order to fit a variety of sizes of hands.

3. An anatomic support for hand and wrist comprising an upper portion, a side portion and an inferior portion made of a substantially rigid material, the inferior portion is provided with an inferior surface, wherein the inferior surface is smooth, having a low friction coefficient, so as to enable the anatomic support for hand and wrist to be easily slid upon the surface where it rests, and wherein the upper portion is made of a substantially elastic material;

a rim of the upper portion is joined to the upper part of the inferior portion;

there is a hollow between the inferior portion and the upper portion;

said hollow is filled up with a highly viscous and nearly solid buttery substance;

wherein a user can push a hand and wrist into the upper portion under pressure to cause the upper portion to assume a first shape which conforms to the shape of the wrist and the anterior part of the hand to anatomically accommodate said wrist and anterior portion of the palm of the hand;

wherein at ordinary room temperatures, after being pressurized to form the first shape, the upper portion will retain the first shape, even if the user removes his hand and wrist from the upper portion, until the user again pushes a hand and wrist into the upper portion under pressure to cause the upper portion to assume a new shape.

4. An anatomic support according to claim 3, wherein it can be provided with a variety of sizes, in order to fit a variety of sizes of hands.

5. An anatomic support according to claim 1, wherein the rear edge of the upper surface of the support is provided with a protrusion that abuts the heel of the hand of a user.

6. A pair of anatomic supports for a user's hand and wrist, each of the supports comprising an upper surface, a side surface and an inferior surface, forming an integral body to anatomically accommodate the wrist and the anterior part of the hand of a user, wherein said inferior surface of each support is smooth, having a low friction coefficient, so as to enable the anatomic support for hand and wrist to be easily slid upon the surface where it rests, wherein the upper surface includes a forward edge, wherein a first support of the pair is shaped to accommodate the user's right hand and wrist, and wherein the second support of the pair is shaped to accommodate the user's left hand and wrist wherein:

a central portion of the forward edge of the upper surface is provided with a permanent protruding region which rises above left and right sides of the forward edge, and which serves as a permanent anatomical abutment for a central region of the palm of the hand of a user;

the remaining parts of the upper surface permanently and anatomically accommodating both the wrist and the remaining regions of the anterior portion of the palm of the hand of said user, wherein a user can push a hand and wrist into the upper surface under pressure to cause the upper portion to assume a first shape which conforms to the shape of the wrist and the anterior part of the hand to anatomically accommodate said wrist and anterior portion of the palm of the hand, and wherein at ordinary room temperatures, after being pressurized to form the first shape, the upper surface will retain the first shape, even if the user removes his hand and wrist from the upper surface, until the user again pushes a hand and wrist into the upper surface under pressure to cause the upper portion to assume a new shape.

7. The pair of anatomic supports according to claim 6, wherein each support of the pair can be provided with a variety of sizes in order to fit a variety of sizes of hands.

8. The pair of anatomic supports according to claim 6, wherein a rear edge of the upper surface of each support is provided with a protrusion that abuts the heel of the hand of the user.

* * * * *